Inventors:
Charles A. Balchunas
William J. McCune, Jr.
by Richard E. Hosley
Their Attorney Aug. 15, 1961  C. A. BALCHUNAS ET AL  2,995,975
PHOTOELECTRIC EXPOSURE METER Filed Nov. 29, 1957  3 Sheets-Sheet 2

Inventors:
Charles A. Balchunas
William J. McCune, Jr.
by Richard E. Hosley
Their Attorney Aug. 15, 1961     C. A. BALCHUNAS ET AL     2,995,975
PHOTOELECTRIC EXPOSURE METER Filed Nov. 29, 1957     3 Sheets-Sheet 3

Inventors:
Charles A. Balchunas
William J. McCune, Jr.
by *Richard E. Horley*
Their Attorney United States Patent Office 2,995,975
Patented Aug. 15, 1961

2,995,975
PHOTOELECTRIC EXPOSURE METER
Charles A. Balchunas, West Peabody, and William J. McCune, Jr., Lincoln, Mass., assignors to General Electric Company, a corporation of New York
Filed Nov. 29, 1957, Ser. No. 699,715
4 Claims. (Cl. 88—23)

The present invention relates to photoelectric exposure meters and more particularly to a meter in which the physical positioning of external or included means for modifying the light sensitivity of the meter, in conformance with a given film speed, selectively and automatically sets up exposure information in the meter.

An exposure meter of the type contemplated herein incorporates a photoelectric cell and a microammeter having a pointer and is adapted to be used with film materials having a wide range of film speeds, for example, ASA speed ratings of from 12 to 3200. Such a meter may employ a scale of exposure numbers which may appropriately duplicate or be readily converted to numbers on the scale of a camera of the type having a single control means for setting both the lens aperture and exposure time. Accordingly, when a given number of the exposure meter scale is indicated by the pointer, it is merely necessary to set the control means of the camera to a similar number, with little or no interpolation being required.

If an exposure meter is to be used in conjunction with films having a very extensive range of emulsion speeds, it usually becomes necessary to employ a sensitivity-increasing means such as a so-called booster photoelectric cell for the higher film speeds, and sensitivity-reducing means such as a shunt in the electrical circuit of the meter or a light-reducing mask in front of the aperture of the photoelectric cell element thereof for the lower film speeds, the intermediate film speeds being accommodated by the photoelectric cell of the meter alone, at its normal aperture. It is with a meter adapted to meet the aforementioned requirements that the present invention is concerned.

Accordingly, an object of the invention is to provide a direct reading exposure meter wherein exposure information is presented in a simple and rapid manner for any of a wide range of film speeds.

Other objects of the invention are to provide an exposure meter having constructions such that the physical steps of mounting a booster photoelectric cell or an electrical shunt on mounting means of the meter to provide a given sensitivity of the meter for a given film speed automatically sets up, or renders viewable, a scale of film speeds in the meter which relates to said given film speed and which is used to obtain a correct exposure number; to provide an exposure meter wherein means for varying the light-admitting aperture to the photoelectric cell also varies the viewability of indicia of a film speed scale; to provide an exposure meter wherein a given group of a plurality of groups of sequentially arranged exposure numbers may be selectively positioned with respect to the meter pointer, said group being positioned in accordance with film speed data and at least partially automatically set up in the meter; to provide an exposure meter of simple and efficient construction in which a rotatable disc carries angularly spaced individual groups of radially aligned film speed indicia arranged to be selectively viewed in accordance with the sensitivity setting of the meter wherein selection of a particular film speed indicia automatically positions a scale of sequentially arranged exposure time indicia for proper cooperation with the meter pointer; to provide an exposure meter of simple and efficient construction in which a single rotatable disc carries individual groups of sequentially arranged exposure time indicia and relevant radially aligned film speed indicia so that when a given group of exposure time indicia is positioned adjacent the pointer of the meter in alignment with a viewing aperture, the relevant film speed marking is located at a second viewing aperture; to provide a photoelectric exposure meter, a booster photoelectric cell and an electrical shunt adapted to be mounted on and to establish electrical connections with the meter, mounting means of the booster cell, shunt and meter also cooperating to selectively actuate mechanisms in the meter for alternately rendering photographic exposure indicia either visible or invisible.

Other objects of the invention will in part be obvious and will in part appear hereinafter.

For a fuller understanding of the nature and objects of the invention, reference should be had to the following detailed description taken in connection with the accompanying drawing wherein.

Figure 1:
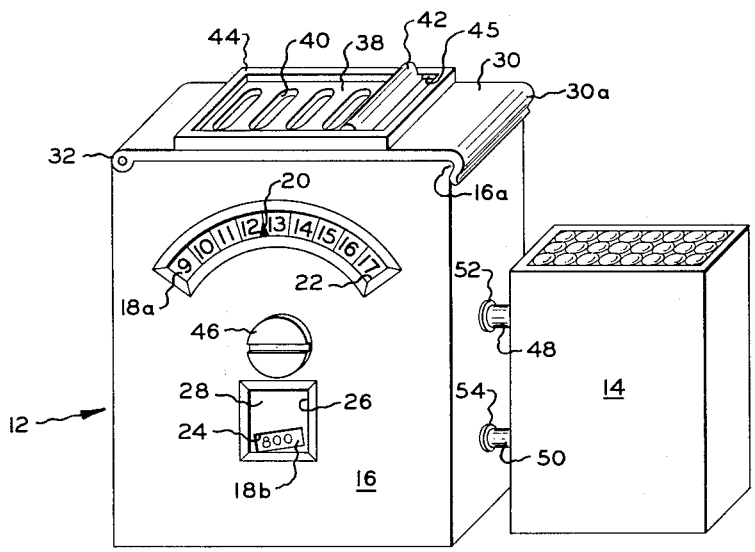
FIGURE 1 is a front, perspective view of an exposure meter of the present invention with a booster photoelectric cell mounted thereon.

Referring to FIGURE 1, a photoelectric exposure meter 12 is shown with a booster photoelectric cell 14 mounted thereon. Meter 12 comprises a preferably metallic or plastic casing 16, a circular scale 18 having an area 18a and a pointer 20 visible through an aperture 22 formed in the front of casing 16. Pointer 20 is positioned adjacent one of a series of exposure numbers, its position with respect to the left- and right-hand extremities of aperture 22 being according to the strength of the electrical current supplied from booster cell 14 to a microammeter element (not shown) of meter 12 to which pointer 20 is attached. Another scale area 18b is visible through a slot 24 and a viewing aperture 26 formed in casing 16. Slot 24 is formed in a movable plate-like element such as the bell-crank element 28, shown more clearly in FIGURE 3.

Figure 6:
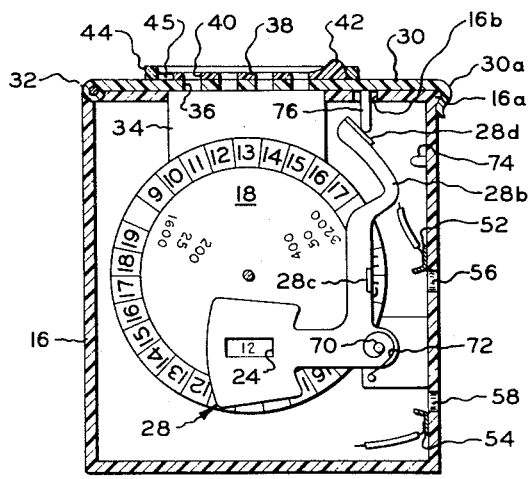
FIGURE 6 is a view similar to FIGURE 3 showing a stage of operation of the meter.

A door or cover 30 pivotally mounted on casing 16 by hinge 32 is provided at that end of the meter at which the aperture for admitting light to photoelectric cell element 34 is located. Any suitable latching or detent means may be provided for holding door 30 at closed position as, for example, the resilient, curved extremity 30a which snaps over the bead 16a of the casing. The door 30 contains several small openings or slots 36 which allow a given lesser amount of light to fall upon the photoelectric cell than is permitted when the door is open, the meter with its door open being partially shown in FIGURE 2. An adjustable panel or mask 38 having a plurality of slots 40, similar in size to slots 36, and an end portion 42 formed for manually moving the panel is adjustably mounted on door 30, as by mounting means 44 having longitudinal grooves 45 in which the edges of the panel are slidably mounted. When the slots 40 of the panel are aligned with slots 36 of the door as shown in FIGURE 6, light is permitted to pass therethrough to photoelectric cell 34; when the respective slots are not thus aligned, as illustrated in FIGURES 1 and 3, light is blocked from entering the meter to the photoelectric cell element.

The meter scale areas 18a and 18b constitute given bands of disc 18 which are used for specific indicia. Area 18a, adjacent the periphery of the disc, carries exposure numbers corresponding to the numbers appearing on the scale of a camera, each of said numbers representing a given time and diaphragm opening. The camera (not shown) may, appropriately, be of a type having a single control means for simultaneously varying shutter speed and lens aperture. It will be noted that the numbers located in peripheral area 18a are arranged in separate groups or series, i.e., series 9–17, series 10–18 and series 11–19. Any one of these groups may be positioned at aperture 22 by turning disc 18, an adjusting screw 46 providing rotation of the disc. The disc area 18b contains numbers representing film speeds. The numbers are arranged in what may be considered as concentric bands, each band comprising a series of three film speeds. Thus, in one band appear the fast film speeds 800, 1600 and 3200; in the second band the slow speeds 12, 25 and 50; and in the third band the intermediate speeds 100, 200, and 400. A given series of exposure numbers is located diametrically opposite and relates to each film speed number. For example, the exposure number series 9–17 lies diametrically opposite and is used in conjunction with the first film speed 800. The positional relationships of other film speed and exposure numbers shown are similarly arranged and will readily be apparent.

In accordance with conventional characteristics of a photoelectric exposure meter, a variation of light incident on the photoelectric cell, a change of photoelectric cells, or use of the shunt or mask will alter the position of the pointer 20 or some combination of these factors may operate to hold the pointer at a given position. For a given level of incident light, variation of the cell, shunt, or mask will cause a corresponding variation in the position of the pointer and thus vary the sensitivity of the meter; that is, vary the relationship of the pointer position to the level of incident light through a variation in the photoelectric current. In the example shown, the film speeds of the first band, namely, 800, 1600 and 3200 involve increasing the sensitivity of the meter through the use of a booster cell 14; the film speeds 12, 25 and 50 of the slow band require decreasing the sensitivity of the meter by the use of either a shunt or by stopping down the light incident on cell 34; and the speeds of the intermediate bands 100, 200 and 400 involve use of meter 12, alone, with door 30 wide open.

When booster cell 14 is used, as shown in FIGURE 1, both door 30 and panel 38 are completely closed. Booster cell 14 is mounted on meter 12 by a pair of pins 48 and 50 having flanges 52 and 54, which limit the depth of their insertion in sockets 56 and 58, respectively, of the meter. Spring clips 60 and 62 engage end portions of the pins and serve as electrical contacts for conducting current from booster cell 14 to the microammeter element of the meter, it being understood that casing 16 is either composed of a suitable insulating material or that means are provided for insulating the sockets from the casing if the latter is of metal. Clips 60 and 62 also serve to frictionally hold the pins in the sockets. Pin 48 is provided with a contacting tip 48a the function of which will be explained below. A shunt unit 64 is also provided having pins 66 and 68 for insertion in said sockets 56 and 58. It is to be noted that end portion 66a of pin 66 of the shunt is shorter than a corresponding portion of pin 48 of the booster cell so that when the respective elements are alternately used, pin 48 extends further into the casing 16 than does pin 66.

The bell crank 28 is pivotally mounted at 70 and is biased for rotation in a clockwise direction, as viewed in FIGURE 3, by a torsion spring 72, the limit of its travel in said direction being fixed by a stop 74. One arm 28a of the bell crank is shaped into a plate or shield containing the aforementioned slot 24. The other arm 28b includes a bearing surface 28c for receiving the tip 48a of pin 48 when the booster cell 14 is employed. During mounting of booster cell 14, the tip 48a of pin 48 is brought to bear against surface 28c of the bell crank. As the pin is further inserted, arm 28 is urged inwardly against the bias of spring 72 and the bell crank is rotated in a counterclockwise direction. Slot 24 is automatically aligned with the circular band which includes one of the fast film speed numbers 800, 1600 or 3200 when pin 48 is inserted in socket 56 to the limit determined by flange 52. Selection of a given speed within this band, in accordance with the known speed of the film being used in the camera, is made by turning screw 46 until said speed appears at slot 24. The correct exposure number is then read at aperture 22.

Figure 2:
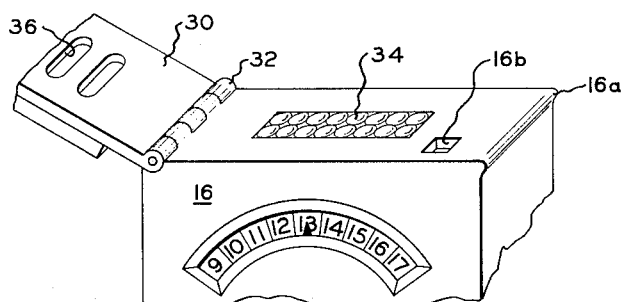
FIGURE 2 is a fragmentary view of a portion of the meter showing the door open.
Figure 3:
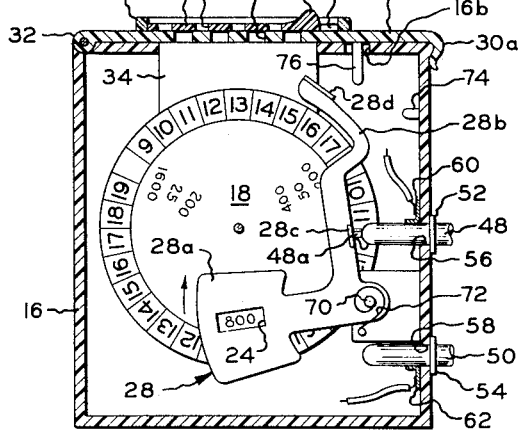
FIGURE 3 is a front elevation view, partly in section, of the exposure meter with the front panel removed to show portions of the internal structure.
Figure 4:
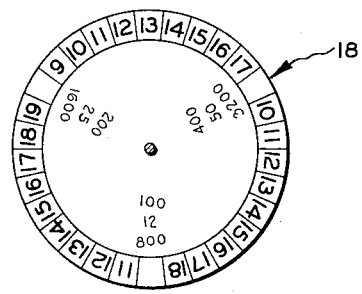
FIGURE 4 is a front view of the disc-like indicia-bearing scale which is partially shown in FIGURES 1 and 2.
Figure 5:
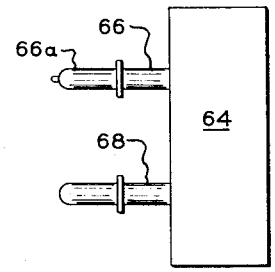
FIGURE 5 is a side view of an electrical shunt having pins for mounting in the sockets of the meter.

Let it be assumed that door 30 is open, as shown in FIGURE 2, and that, instead of booster cell 14, the shunt 64 is used as heretofore described to decrease the sensitivity of the meter. When the shunt is mounted on meter 12, pin portion 66a being shorter than a similar portion of pin 48 shown in FIGURE 3 allows torsion spring 72 to rotate the bell crank a short distance in a clockwise direction with respect to the position shown in FIGURE 3. Accordingly, slot 24 is brought into alignment with the circular band of relatively slow film speeds 12, 25 and 50 and screw 46 is then turned to bring the exact speed number of the film being used in the camera into alignment with said slot. It will be noted that the three series of exposure numbers 9–17, 10–18 and 11–19 contain certain common numbers but that the position of said numbers is different, from left-to-right, in each series. The numbers of each scale and their relative location with respect to the left- and right-hand limits of aperture 22 are calculated with reference to light intensity differences and to pointer response thereto using, alternatively, the photoelectric cells 34 or 14, the shunt, or the masking means, hereinafter described. Accordingly, accurate exposure number readings are obtained at aperture 22 for any film speed which is set up at slot 24.

An alternate construction for decreasing the sensitivity of the meter employs the panel or mask 38 rather than the shunt, above described. As illustrated in FIGURE 6, door 30 is closed and the mask 38 is moved along guides 45 so that apertures 40 of the mask are aligned with apertures 36 of the cover and a given amount of light, less than that which would be incident on the unmasked photoelectric cell 34, is admitted. A diagonally extending surface 28d is provided at one extremity of the bell crank 28 and a stud 76 extends downwardly from cover 30 so as to project through a slot 16b in case 16. When the cover is closed, stud 76 slidably engages angular surface 28d causing bell crank 28 to pivot to a given degree in a counterclockwise direction. Slot 24 is thereby positioned in register with the circular band of film speed numbers 12, 25 and 50, the particular film speed reading being obtained by turning screw 46.

With the door 30 open, as shown in FIGURE 2, the meter is adapted to use with films having intermediate emulsion speeds, such as the ASA speed ratings 100, 200 and 400. As will be understood, neither the booster cell nor the shunt is mounted on the meter during operation in conjunction with these film speeds and bell crank 28 is permitted to pivot as far as it will go in a clockwise direction, namely, until arm 28b comes in contact with stop 74. The aforesaid rotation of the bell crank brings slot 24 in register with the applicable band of film speeds. Screw 46 is then turned to bring the selected film speed to slot 24 so as to be visible through aperture 26 and to position the related series of exposure numbers at aperture 22.

Figure 7:
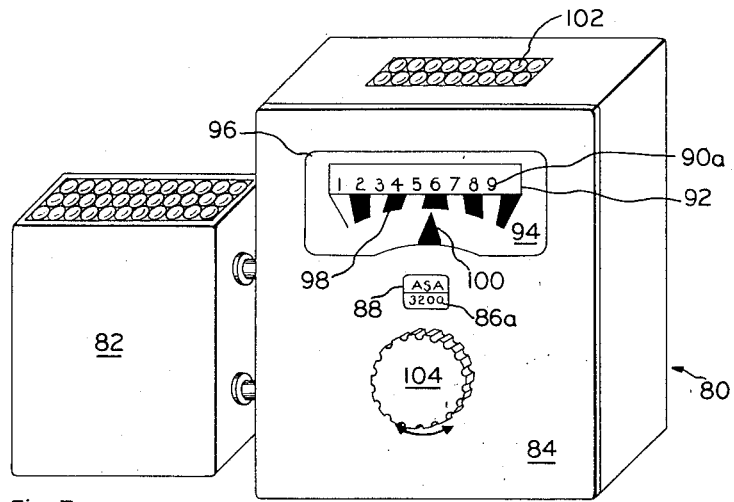
FIGURE 7 is a view similar to FIGURE 1, showing an exposure meter and associated booster photoelectric cell illustrating another form of the invention.

Referring to FIGURE 7, there is shown another form of the invention disclosed in FIGURE 1 comprising a somewhat similar and in some respects simpler photoelectric exposure meter 80 having a booster photoelectric cell 82 mounted thereon. Unlike the exposure meter shown in FIGURE 1, meter 80 has no external shutter to modify its response, nor is it intended to be used with an external shunt but it does illustrate the automatic selection of film speeds in an exposure meter intended to be used with a booster photoelectric cell.

In addition, and again unlike the arrangement shown in FIGURE 1, the two scales used for deriving exposure information are arranged on separate members instead of the single disc heretofore described.

As with the exposure meter of FIGURE 1, meter 80 comprises a plastic housing 84 (plastic is preferable, although a metallic housing could be used just as well), a first scale 86 having an area 86a visible through an aperture 88 provided in the front panel of the housing, and a second scale 90 having an area 90a visible through an aperture 92 formed in an auxiliary scale member 94 which in turn is visible through the aperture 96 provided in the front panel of housing 80. Auxiliary scale member 94 includes a series of transfer lines 98 which are intended to cooperate with a pointer 100 and the indicia on scale 90 when the meter is read by its user.

Pointer 100 is part of a conventional indicating mechanism which will include a conventional microammeter element (not shown) arranged to respond to the current developed by a conventional built-in photoelectric cell 102, with or without the booster photoelectric cell 82.

The indicia in scale 90 comprise a single band of exposure numbers (or light values) corresponding to similar numbers found on the setting scale of certain cameras, each of said numbers representing a given shutter speed and diaphragm opening. The numerical sequence of these indicia differs from the sequence shown in FIGURE 1, but it is to be understood that both sequences span essentially the same range in exposure information, the numbers 9—19 shown on disc 18 being part of a uniform scale in general use and the numbers 1—9 on scale 90 being the scale selected by a particular camera manufacturer. The numbers 9—19 could be substituted for the numbers 1—9 on scale 90, but no matter which numbers are used, the pointer 100 will indicate a particular number after which the camera may be quickly and easily set for proper exposure, either directly or by simple conversion, depending upon the scale used on the camera.

On scale 86, the indicia relate to film speed and are arranged in concentric bands, the outer band comprising the ASA film speeds 100, 200, 400 and 800, with the inner band comprising the ASA speeds 1600, 3200, 6400. The ASA speeds are established by the American Standards Association and are used uniformly in the photographic industry.

Unlike the disc 18, which has the exposure numbers divided into three groups and fixed thereon in proper relationship to the film speed indicia whereby selection of film speed automatically positions the proper group of exposure numbers, the scales 86 and 90 are on separate members but a coupling arrangement has been devised to achieve the same results derived through the use of a single member on which both scales are carried.

Thus, the scale 86 is a rotatably mounted disc-like member (the mounting arrangements being conventional and thus omitted in the interest of brevity) having a knob 104 arranged externally of housing 84 for adjustment of scale position. The peripheral edge of scale 86 is formed as a substantially oval-shaped cam surface 106 which has cooperating therewith a cam follower 108 rotatably mounted on one end of a link 110 pivotally mounted at 112 within housing 84.

The other end of link 110 carries a pin 114 which is captively arranged within an inclined slot 116 formed in scale 90, the scale being provided with two additional slots 118, 120, each of which has the mounting pins 122, 124 captively arranged within. These mounting pins may be part of housing 84 and the arrangement is such that the scale 90 is slidably mounted within the housing, its precise transverse position being controlled by the link 110. Completing the coupling assembly is the spring 126 connected between link 110 and housing 84 and arranged so that the link is urged in a clock-wise direction about its pivot 112.

In operation, rotation of scale 86 carries cam follower 108 transversely within the housing, under the urging of spring 126, such that pin 114, through its cooperation with inclined slot 116, moves the scale 90 transversely relative to aperture 92. The parts are so related, and the scale indicia so selected and arranged, that selection of a particular film speed number automatically positions the scale numbers 90a in proper position relative to pointer 100. Viewed functionally, it is thus apparent that the two-part scale assembly of meter 80 is similar to the unitary scale arrangement of meter 12, in that for each construction, the scale of exposure numbers is automatically and properly positioned in accordance with selection of film speed.

As discussed above, selection of film speed for meter 80 is derived through the use of knob 104, with the film speed selected being viewable through housing aperture 88. In order to automatically render viewable the appropriate band or group of film speeds, in accordance with the use of the exposure meter with or without the booster cell 82, a movable plate 128 is interposed between scale 86 and aperture 88. Plate 128 is slidably mounted within housing 84, having its opposite transverse edges supported by a plurality of fixedly mounted rollers 130 with a spring 132 connected to the plate and arranged to urge it against the fixed stop member 134.

Plate 128 has a pair of viewing apertures 136, 138 arranged in step-like fashion, with the letters "ASA" being arranged contiguous to each aperture, being above and below the apertures, respectively.

Figure 8:
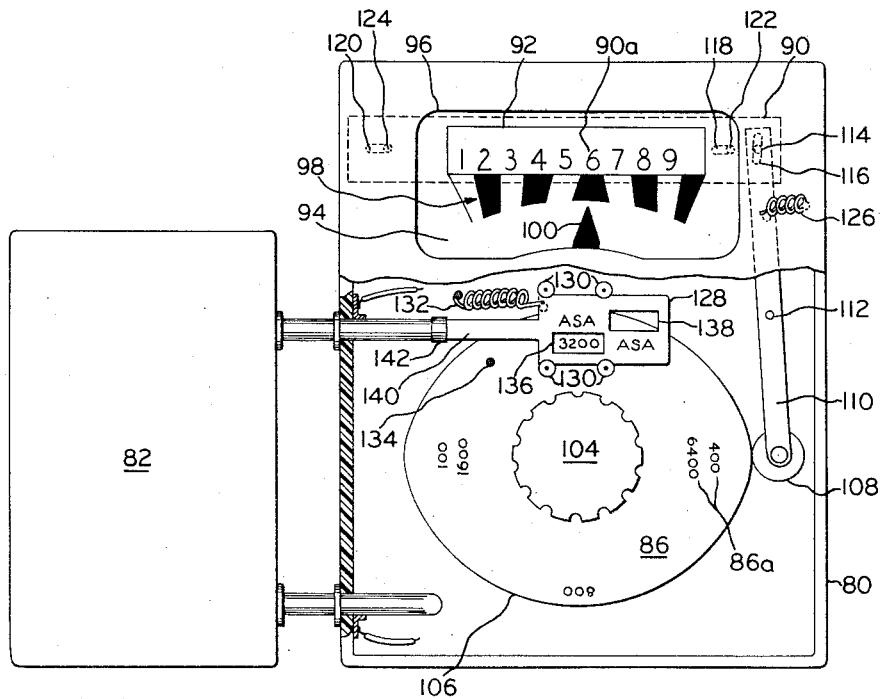
FIGURE 8 is a front elevation view, partly in section, of the arrangement shown in FIGURE 7, with a portion of the front panel removed to show portions of the internal structure.

Apertures 136, 138 are at different radial distances relative to the axis of scale 86, with aperture 136 being arranged for viewing of the film speeds 1600, 3200 and 6400, whereas aperture 138 permits viewing of film speeds 100, 200, 400 and 800. In the position shown in FIGURES 7 and 8, aperture 136 has been lined up with aperture 88, so that the film speed 3200 is viewable by the meter user.

In order to align either of the apertures 136, 138 with aperture 88, plate 128 has an elongated lateral extension 140, equipped with a suitably dimpled cap of insulation 142, arranged for cooperation with one of the inwardly projecting pins of booster cell 82. This cell is in all respects similar to cell 14 and its mounting arrangements may be the same, with appropriately arranged pins, sockets, and the like, all in the manner described in connection with the arrangements of FIGURE 1. A description of such arrangements will not be repeated here, but it is apparent that with the cell 82 in place, one of its pins engages extension 140 and moves the plate 128 to the right, bringing aperture 136 in alignment with aperture 88.

With the cell 82 removed, the spring 132 will pull the plate 128 to the left, against stop 134, and thus bring aperture 138 in alignment with aperture 88.

Thus, for either condition of the exposure meter 80— both the operative and inoperative positions of the booster cell 84—the plate 128 is automatically moved to render viewable the appropriate band of film speeds, after which selection of a particular film speed within the band is derived through manipulation of knob 104.

From the above, it is seen that the automatic selection of film speed ranges may be accomplished with either a rotatably or slidably mounted plate member. It is to be understood that the rotary arrangement of FIGURE 1 could be readily applied to the meter of FIGURE 7 and in like manner, the sliding arrangement of FIGURE 7 could be adapted to the meter of FIGURE 1.

It will be apparent that various other modifications can be made in the meter of FIGURES 1 and 7 without materially departing from the scope of the invention. For example, a connection between arm 28b and mask 38 of meter 12 could be provided so that the mask 38 automatically blocks light to cell 34 at maximum counter-clockwise rotation of bell crank 28. Alternatively, the photoelectric cell 34 of the meter 12 could have so high a sensitivity that it would be unnecessary to employ a booster cell at all. The masking means 38 and the shunt 64, or some combination thereof, could be used for all three of the film speed bands enumerated, the means for altering the position of slot 24 with respect to film speed indicia, such as the bell crank 28, being responsive to elements such as pins 66 and 68 of the shunt, the appendage 76 of the cover or to some other element associated with a unit the physical movement of which initiates an alteration in the sensitivity of the meter. While a preferred construction of meter 12 provides that when booster cell 14 is used, cell 34 is blocked out, it will be understood that both cells could be used together—like the arrangement in FIGURE 7—for high sensitivity readings if designed for the purpose. It will also be apparent that either meter could be incorporated with a camera and employ the camera housing rather than the individual housings 16 and 84.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. A photoelectric exposure meter comprising a housing, a photoelectric cell in said housing, external modifying means manually positionable from the outside of said meter for varying the sensitivity of said meter, said photoelectric cell producing an electric current proportional to the sensitivity of said meter and to the intensity of the incident light, an indicating means responsive to said electric current, a rotatable disc-like scale carrying adjacent its periphery a plurality of groups of indicia relating to lens aperture openings and shutter speeds of a camera and inwardly of its periphery a plurality of bands of film speed indicia, each of said bands defining a specific range of film speed indicia, the ranges of film speed indicia on said bands being related to each other in the same ratios as the sensitivity of the meter is varied by said external modifying means, each of said plurality of bands including a film speed corresponding to each of the plurality of groups of indicia relating to lens aperture openings and shutter speeds, viewing means automatically positioned in accordance with the position of said external modifying means for rendering only one of said bands of film speeds viewable, manually operated means for rotating said scale to a position in which a desired film speed in the viewable band may be viewed through said viewing means, a first viewing aperture in said housing over said viewing means for displaying only said desired film speed, a second viewing aperture in said housing for displaying only the group of indicia relating to lens aperture openings and shutter speeds corresponding to the desired film speed, said indicating means responsive to the electric current also being viewable in said second aperture to indicate directly on the displayed group of indicia a particular indicia for the light measured and the selected film speed.

2. A photoelectric exposure meter comprising a housing, a photoelectric cell in said housing, an external photoelectric cell manually positionable from the outside of said meter for varying the sensitivity of said meter, whereby an electric current produced in said meter is proportional to the sensitivity of said meter and to the intensity of the incident light, and indicating means responsive to said electric current, a rotatable disc-like scale carrying adjacent its periphery a plurality of groups of indicia relating to lens aperture openings and shutter speeds of a camera and inwardly of its periphery a plurality of bands of film speed indicia, each of said bands defining a specific range of film speed indicia, the ranges of film speed indicia on said bands being related to each other in the same ratios as the sensitivity of the meter is varied by said external photoelectric cell, each of said plurality of bands including a film speed corresponding to each of the plurality of groups of indicia relating to lens aperture openings and shutter speeds, viewing means automatically positioned in accordance with the position of said external photoelectric cell for rendering only one of said bands of film speeds viewable, manually operated means for rotating said scale to a position in which a desired film speed in the viewable band may be viewed through said viewing means, a first viewing aperture in said housing over said viewing means for displaying only said desired film speed, a second viewing aperture in said housing for displaying only the group of indicia relating to lens aperture openings and shutter speeds corresponding to the desired film speed, said indicating means responsive to the electric current also being viewable in said second aperture to indicate directly on the displayed group of indicia a particular indicia for the light measured and the selected film speed.

3. A photoelectric exposure meter comprising a housing, a photoelectric cell in said housing, external masking means manually positionable from the outside of said meter for varying the sensitivity of said meter, said photoelectric cell producing an electric current proportional to the sensitivity of said meter and to the intensity of the incident light, an indicating means responsive to said electric current, a rotatable disc-like scale carrying adjacent its periphery a plurality of groups of indicia relating to lens aperture openings and shutter speeds of a camera and inwardly of its periphery a plurality of bands of film speed indicia, each of said bands defining a specific range of film speed indicia, the ranges of film speed indicia on said bands being related to each other in the same ratios as the sensitivity of the meter is varied by said external masking means, each of said plurality of bands including a film speed corresponding to each of the plurality of groups of indicia relating to lens aperture openings and shutter speeds, viewing means automatically positioned in accordance with the position of said external masking means for rendering only one of said bands of film speeds viewable, manually operated means for rotating said scale to a position in which a desired film speed in the viewable band may be viewed through said viewing means, a first viewing aperture in said housing over said viewing means for displaying only said desired film speed, a second viewing aperture in said housing for displaying only the group of indicia relating to lens aperture openings and shutter speeds corresponding to the desired film speed, said indicating means responsive to the electric current also being viewable in said second aperture to indicate directly on the displayed group of indicia a particular indicia for the light measured and the selected film speed.

4. A photoelectric exposure meter comprising a housing, a photoelectric cell in said housing, an external electric shunt manually positionable from the outside of said meter for varying the sensitivity of said meter, whereby an electric current produced in said meter is proportional to the sensitivity of said meter and to the intensity of the incident light, an indicating means responsive to said electric current, a rotatable disc-like scale carrying adjacent its periphery a plurality of groups of indicia relating to lens aperture openings and shutter speeds of a camera and inwardly of its periphery a plurality of bands of film speed indicia, each of said bands defining a specific range of film speed indicia, the ranges of film speed indicia on said bands being related to each other in the same ratios as the sensitivity of the meter is varied by said external shunt, each of said plurality of bands including a film speed corresponding to each of the plurality of groups of indicia relating to lens aperture openings and shutter speeds, viewing means automatically positioned in accordance with the position of said external shunt for rendering only one of said bands of film speeds viewable, manually operated means for rotating said scale to a position in which a desired film speed in the viewable band may be viewed through said viewing means, a first viewing aperture in said housing over said viewing means for displaying only said desired film speed, a second viewing aperture in said housing for displaying only the group of indicia relating to lens aperture openings and shutter speeds corresponding to the desired film speed, said indicating means responsive to the electric current also being viewable in said second aperture to indicate directly on the displayed group of indicia a particular indicia for the light measured and the selected film speed.

References Cited in the file of this patent

UNITED STATES PATENTS

| | | |
|---|---|---|
| 2,129,114 | Bernhardt et al. | Sept. 6, 1938 |
| 2,274,441 | Williams | Feb. 24, 1942 |
| 2,297,262 | Tonnies | Sept. 29, 1942 |
| 2,584,440 | Fogle | Feb. 5, 1952 |
| 2,590,165 | Fairbank et al. | Mar. 25, 1952 |

FOREIGN PATENTS

| | | |
|---|---|---|
| 691,440 | Germany | May 27, 1940 |